United States Patent Office 3,235,511
Patented Feb. 15, 1966

3,235,511
REGENERATION OF SULFIDED HYDRO-
GENATION CATALYSTS
Walter R. Derr, Jr., Ashland, N.J., assignor to Socony
Mobil Oil Company, Inc., a corporation of New York
No Drawing. Filed Mar. 23, 1962, Ser. No. 182,076
6 Claims. (Cl. 252—419)

The present invention relates to the regeneration of hydrogenation catalysts after use for hydrodesulfurizing mixtures of hydrocarbons containing sulfur compounds and, more particularly, to the regeneration of hydrogenation catalysts in the presence of which and of hydrogen organic sulfur compounds are converted to hydrogen sulfide. The present invention relates specifically to the regeneration of hydrogenation catalysts having hydrodesulfurization capabilities comprising mixtures of oxides of cobalt and molybdenum on alumina support.

In general, hydrodesulfurization in the petroleum industry is practiced in preparing reformer feed and in refining fuel fractions boiling above the boiling range of gasoline. That is to say when the raw naphtha to be reformed contains more than 200 p.p.m. (parts per million) of sulfur the raw naphtha is mixed with hydrogen-containing gas and contacted with hydrogenating catalyst having hydrodesulfurizing capabilities at elevated temperatures of the order of 600° F. and higher. When the raw naphtha to be reformed in the presence of platinum-group metal reforming catalyst contains more than 1 p.p.m. of nitrogen even though the sulfur concentration is below 200 p.p.m. the raw naphtha is hydrodenitrogenized and hydrodesulfurized, i.e., hydrodecontaminated, by mixing the raw naphtha with hydrogen-containing gas and contacting at elevated temperature of at least 600° F. with hydrogenating catalyst having hydrodesulfurizing and hydrodenitrogenizing capabilities.

In the refining kerosine, domestic fuel oil, diesel fuel, jet fuel and in general fuel fractions of petroleum boiling above the boiling range of gasoline it is becoming more general practice to hydrodesulfurize the petroleum fraction to reduce the sulfur content thereof to specification limits.

Whether the hydrodesulfurization be practiced for the purpose of pretreating reformer feed to provide hydrodecontaminated reformer feed or for the purpose of reducing the sulfur and/or nitrogen concentration in a fuel fraction to a value within the limits set forth in the specification sooner or later the hydrogenation catalyst becomes deactivated by a carbonaceous deposit designated coke contaminated to a greater or lesser degree with iron sulfide. The deactivated hydrodesulfurization catalyst is then regenerated.

Illustrative of the regeneration procedure generally practiced is the following sequence of operations:

(1) Purge gas, e.g., fuel gas, hydrogen-containing reformer gas, or in general any inert non-oxidizing gas is passed through the hydrodesulfurizing unit comprising a feed heater, at least one reactor, at least one cooler and a liquid-gas separator together with piping for series flow from said heater to said cooler and a compressor (for hydrogen-recirculation) whilst maintaining a heater outlet temperature of at least 600° F. until all liquid is stripped from the unit as indicated by the absence of condensate at the liquid-gas separator or flash drum.

(2) The fuel supply to the unit heater is shut off and the reactor cooled to about 500° F.

(3) The flow of purge gas through the unit is discontinued.

(4) The hydrodesulfurizing unit is depressured either to the refinery fuel main or vented to the atmosphere dependent upon local conditions.

(5) The hydrodesulfurizing unit is evacuated to about 25 inches of mercury pressure (vacuum).

(6) The hydrodesulfurizing unit is pressured to about 2 p.s.i.g. with inert flushing gas such as nitrogen.

(7) The hydrodesulfurizing unit is evacuated again to about 25 inches of mercury pressure (vacuum).

(8) The hydrodesulfurizing unit is filled with flushing gas such as nitrogen. Operation 5 and 6 supra are repeated, if necessary, until the hydrocarbon content of the reactor effluent gas is not more than 2.0 percent by volume.

(9) When the hydrocarbon content of the effluent gases of the reactor does not exceed 2.0 percent by volume, steam is added, preferably at the heater inlet, to the flushing gas, the heater outlet temperature is held at about 750° F. and the reactor effluent vented.

(10) With the reactor inlet temperature at about 750° F. when the temperature of the reactor effluent reaches about 700° F. air is admixed with the steam at the heater inlet and incrementally increased to about 7.5 mol percent maximum whilst holding the reactor temperature to not higher than 1050° F. by regulating the air flow rate.

(11) After the temperature peak or burning front has passed completely through the reactor catalyst bed, the flow of fuel to the heater is stopped and the catalyst bed cooled to about 400° F. with a steam-air mixture of 7.5 mols of air per mol of steam.

(12) The flow of steam to the reactor is reduced incrementally until the concentration of air reaches about 15 to about 20 mol percent.

(13) The catalyst is cooled in the air-steam mixture containing about 15 to about 20 mol percent air until the catalyst temperature is in the range of about 275° F. to about 300° F.

(14) The temperature of the reactor effluent gas is held in the range of about 250° to about 300° F. for at least two hours whilst obtaining the minimum pressure possible in the unit.

(15) The concentration of steam is slowly reduced in the steam-air mixture until only air is flowing through the unit.

(16) The flow of air through the unit is continued until the catalyst temperature is substantially ambient temperature, i.e., less than 100° F.

It is to be observed that (1) the preferred maximum regeneration pressure is 100 p.s.i.g.; (2) an adequate reactor temperature must be maintained to prevent steam from condensing inside the reactor; and (3) if combustion occurs, as indicated by rising reactor temperatures, during operations 11 and 12 supra, air is removed from the unit by introducing steam.

Although the foregoing procedure would appear to insure careful control to eliminate uncontrolled burning of the catalyst coke and spontaneous combustion of the pyrophoric iron produced by oxidation of the iron sulfide to finally divided metallic iron and oxides of sulfur, several instances of uncontrolled burning resulting in damage both to equipment and the catalyst have occurred. This has required determination of the cause of the uncontrolled burning and the modification of the foregoing regeneration procedure in accordance with the principles of the present invention.

The method of regeneration of the present invention provides for (1) insuring complete burning of the carbon of the coke deposit on the catalyst before cooling the catalyst bed and (2) cooling the catalyst bed to a temperature at which pyrophoric iron does not ignite, e.g., not higher than about 250° to about 365° F. depending on reactor pressure in a mixture of steam and air containing not more than about 10.0 mol percent of air.

Several refineries have experienced runaway burning during regeneration of hydrogenation catalysts employed in the hydrodecontamination of sulfur-containing petroleum fractions. Generally, the uncontrolled burning has occurred near the end of the regeneration whilst the temperature of the catalyst bed was in the range of about 350° to about 400° F. and when the concentration of air in the gases passing through the unit was in excess of about 15 to about 20 mol percent.

Combustion of pyrophoric iron produced by the decomposition of the iron sulfide in the coke deposited on the catalyst to finely divided metallic iron and oxides of sulfur at oxygen concentrations in excess of about 15 to 20 mol percent may cause uncontrolled burning normally at the top or in the upper portion of the catalyst bed.

The method of regenerating hydrocontamination catalyst of the present invention was used in the regeneration of hydrogenation catalyst having hydrodesulfurization and hydrodenitrogenation capabilities and comprising a mixture of oxides of cobalt and molybdenum on alumina support when the coke deposited on the catalyst contained about 10 percent by weight of carbon and the interior surfaces of the unit had a heavy coating of sulfide-scale.

The improved method of regenerating hydrogenation catalyst used for hydrodecontamination of petroleum fuel fractions containing sulfur comprises the first eight steps of the herein previously described regeneration procedure and the following additional operations:

(9) When the hydrocarbon content of the effluent gases of the reactor does not exceed 2.0 percent by volume, steam is injected into the flushing gas at the desired rate at the heater inlet, the heater is fired, and the heater outlet temperature raised to about 750° F.

(10) When the reactor outlet temperature reaches about 700° F. introduction of air into the flowing stream of steam is initiated at the heater inlet and the concentration of air in the flowing steam air mixture is incrementally increased to about 7.5 mol percent maximum whilst regulating the air flow rate to maintain a maximum temperature in the catalyst bed not in excess of 1050° F.

(11) The flow of steam-air mixture at an air concentration not exceeding 7.5 mol percent and at a reactor inlet temperature of about 750° F. is continued until the temperature at the reactor outlet is 750° F. or lower.

(12) Thereafter the temperature of the steam-air mixture containing not in excess of 7.5 mol percent air is slowly raised to a heater outlet temperature (reactor inlet temperature) of 875° F. whilst maintaining a maximum catalyst bed temperature not in excess of 1050° F.

(13) The flow of the steam-air mixture containing not in excess of 7.5 mol percent air at a temperature of about 875° F. (reactor inlet temperature) is continued until the temperature at the reactor outlet temperature is equal to or less than 875° F.

(14) Whilst holding the heater outlet temperature (reactor inlet temperature) at about 875° F. the concentration of air in the steam-air mixture is increased incrementally to 10 mol percent maximum whilst not exceeding a catalyst bed temperature of 1050° F.

(15) After contacting the catalyst bed at a reactor inlet temperature of about 875° F. with the steam-air mixture containing about 10 mol percent of air until there is no further increase in temperature in the catalyst bed, indicative of the cessation of burning, the catalyst bed is contacted at a reactor inlet temperature of about 875° F. with the steam-air mixture containing about 10 mol percent air for at least about two hours to permit ample time for diffusion of the regeneration medium through all possible agglomerations of coke and catalyst.

(16) Whilst maintaining the flow of the steam-air mixture containing 10 mol percent of air, the temperature at the heater outlet is reduced and the temperature in the catalyst bed reduced to a temperature in the range of about 250° to about 365° F. dependent on reactor pressures. The steam must not be permitted to condense within the reactor.

(17) After the temperature in the catalyst bed is not in excess of about 250° to about 365° F. the concentration of steam in the steam-air mixture is incrementally reduced whilst reducing the catalyst bed temperature to below about 180° F. with air containing less than 5 percent of steam. (During this operation a careful check is kept on the catalyst bed temperature to guard against sudden re-ignition of the catalyst bed as indicated by a rise in catalyst bed temperature.)

This completes the regeneration of hydrogenation catalyst having hydrodecontaminating capabilities including hydrodesulfurizing capability when the activity thereof is reduced by the deposition of a carbonaceous material containing iron sulfide which is converted during regeneration to finely divided pyrophoric iron and sulfur oxides.

The unit is then purged with inert gas such as nitrogen preferably in the manner described hereinbefore, until the oxygen content of the effluent gas from the reactor does not exceed 0.8 percent by volume. After the purge, the catalyst is contacted statically or dynamically with hydrogen or hydrogen sulfide or a mixture of hydrogen and hydrogen sulfide to convert the oxides of cobalt and molybdenum produced during regeneration to the metals and/or sulfides.

I claim:

1. A method for regenerating and cooling a hydrogenation catalyst having deposited thereon carbonaceous material and pyrophoric iron which comprises burning carbonaceous material from said hydrogenation catalyst with a gaseous stream containing not more than about 10 mol percent free oxygen at a catalyst bed temperature not in excess of about 1050° F., regulating the free oxygen concentration of said gaseous stream to not more than 10 mol percent when the temperature of said catalyst bed during said burning step drops to a temperature lower than 1050° F. to assure complete combustion of any residual carbonaceous material remaining on the catalyst, thereafter reducing the temperature of the catalyst bed with said free oxygen containing gaseous stream to a temperature above a steam condensation temperature and below a temperature at which pyrophoric iron ignites and below about 350° to about 400° F. when the concentration of air in said gaseous stream is in excess of about 15 to about 20 mol percent, and further cooling the catalyst in an air atmosphere to a temperature below about 180° F.

2. The method of regeneration set forth in claim 1, wherein the hydrogenation catalyst comprises a mixture of oxides of cobalt and molybdenum on alumina support.

3. The method of regeneration set forth in claim 1, wherein the reactor pressure during combustion of the carbonaceous deposit containing sulfide of iron is a maximum of 100 p.s.i.g.

4. In the method of regenerating hydrogenation catalyst having deposited thereon carbonaceous material containing iron compound oxidizable at regeneration temperatures to finely divided pyrophoric iron the improvement which comprises burning the carbon of said carbonaceous deposit completely in a mixture of steam and gas containing free oxygen, cooling said catalyst to a temperature in the range of about 250° to about 365° F. in the presence of a mixture of steam and said oxygen-containing gas containing not more than about 2.1 mol percent of said oxygen-containing gas, expressed as mol percent oxygen, and thereafter cooling the catalyst in an air atmosphere to a temperature below about 180° F.

5. The method of regeneration set forth in claim 4, wherein the hydrogenation catalyst comprises a mixture of oxides of cobalt and molybdenum on alumina support.

6. A method for regenerating a hydrogenation catalyst having hydrodesulfurization and hydrodenitrogenation capabilities and contaminated with a deposit comprising carbonaceous material which comprises burning carbonaceous material substantially completely from said hydrogenation catalyst with steam containing no more than about 10 mol percent of air at a catalyst bed temperature not in excess of about 1050° F., when the burning step is complete, reducing the temperature of said catalyst bed with said steam-air mixture until a temperature below about 365° F. but above the condensation temperature of steam in said steam-air mixture is attained, and thereafter cooling the regenerated catalyst to a temperature below about 180° F. with air alone.

References Cited by the Examiner

UNITED STATES PATENTS

| | | | |
|---|---|---|---|
| 2,344,770 | 3/1944 | Gunness | 252—419 |
| 2,856,350 | 10/1958 | Love | 252—419 |
| 3,076,755 | 2/1963 | Stark et al. | 252—419 |

MAURICE A. BRINDISI, *Primary Examiner.*